(12) United States Patent
Bailey et al.

(10) Patent No.: US 8,083,438 B2
(45) Date of Patent: Dec. 27, 2011

(54) MECHANICALLY PRODUCED THERMOCLINE BASED OCEAN TEMPERATURE REGULATORY SYSTEM

(76) Inventors: Laura J. Bailey, Denver, CO (US); John T. Bailey, Denver, CO (US)

( * ) Notice: Subject to any disclaimer, the term of this patent is extended or adjusted under 35 U.S.C. 154(b) by 8 days.

(21) Appl. No.: 12/449,841

(22) PCT Filed: Feb. 29, 2008

(86) PCT No.: PCT/US2008/004270
§ 371 (c)(1),
(2), (4) Date: Aug. 28, 2009

(87) PCT Pub. No.: WO2008/109187
PCT Pub. Date: Sep. 12, 2008

(65) Prior Publication Data
US 2010/0213271 A1    Aug. 26, 2010

Related U.S. Application Data

(60) Provisional application No. 60/904,412, filed on Mar. 2, 2007.

(51) Int. Cl.
*A01G 15/00* (2006.01)
(52) U.S. Cl. .................. 405/195.1; 405/75; 405/303
(58) Field of Classification Search ............... 405/195.1, 405/75, 76, 52, 115
See application file for complete search history.

(56) References Cited

U.S. PATENT DOCUMENTS

| | | | | | |
|---|---|---|---|---|---|
| 3,849,993 | A | * | 11/1974 | Robinson et al. | 405/217 |
| 4,051,810 | A | * | 10/1977 | Breit | 405/52 |
| 4,298,295 | A | * | 11/1981 | Bozzo et al. | 405/52 |
| 4,470,544 | A | * | 9/1984 | Bronicki et al. | 239/2.1 |
| 2007/0270057 | A1 | * | 11/2007 | Feldman et al. | 441/1 |

* cited by examiner

*Primary Examiner* — John Kreck

(57) ABSTRACT

A Mechanically Produced Thermocline Based Ocean Temperature Regulatory System to sequester carbon dioxide, create a cold water barrier to hurricanes and tropical storms, and ensure the function of the thermohaline circulation.

17 Claims, 4 Drawing Sheets

MECHANICALLY PRODUCED THERMOCLINE BASED OCEAN TEMPERATURE REGULATORY SYSTEM

CROSS-REFERENCE TO RELATED APPLICATIONS

This application is a national stage entry of PCT/US2008/004270, filed 29 Feb. 2008; which claims priority to provisional application 60/904,412, filed 2 Mar. 2007.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Global warming is the greatest danger mankind has faced in history. The danger of flooding to coastal regions is real and has accelerated in recent years. Islands have disappeared and millions are in danger of losing their homes. The atmospheric temperature of the Earth has increased as the oceans and seas have stratified. The stratification of the water's surface has reduced the natural upwelling that has historically regulated the oceans' surface temperature. The stratification of the surface's temperature has adversely affected the solubility pump, causing CO2 to be dissolved as carbonic acid. The increase in carbonic acid has increased the acidification of sea water. The acidification has caused the dissolution of coral. The coral reefs around the world are in crisis.

The increased acidification has diminished the function of the biological pump. The increased temperature and change in pH of the oceans waters has greatly reduced the amount of phytoplankton, reducing fish stocks and reducing the amount of CO2 being sequestered by the oceans.

The greatest CO2 sink has been the southern oceans. The year of 2007 was the first year that the southern oceans began to give off more CO2 than they took in. The purpose of this invention is to regulate the temperature of the oceans' surface to promote CO2 sequestration by encouraging the increased growth of phytoplankton.

BRIEF SUMMARY OF THE INVENTION

We at Royal Rose Enterprises have developed a process for use in the sequestration of anthropogenic carbon dioxide. The increased stratification of the world's oceans, due to elevated atmospheric temperatures has diminished the effectiveness of the biological pump.

Phytoplankton populations have declined due to changes in temperature and alkalinity, reducing the amount of carbon dioxide being sequestered out of solution. The concentration of carbon dioxide dissolved in ocean water has increased, directly effecting the chemical composition of the oceans. The presence of elevated levels of dissolved carbon dioxide has created a direct corresponding increase in the presence of carbonic acid. The increase in carbonic acid has lead to an increase in the acidification of the world's oceans. Alkalinity effects the growth of phytoplankton and directly controls the solubility of carbon dioxide and how it dissolves into the oceans. The reduced growth of phytoplankton has slowed the sequestration of carbon dioxide. The change in the chemical composition of ocean water has slowed the remediating function of the biological pump to sequester anthropogenic carbon dioxide. The biological pump has, until now, reduced the effects of elevated levels of carbon dioxide, as this process slows, the effects of elevated carbon dioxide will accelerate climate change.

We at Royal Rose Enterprises have developed a process to create a thermocline to increase the sequestration of carbon dioxide in the ocean. The basis of our process is to mechanically pump deep cold water to the surface of the ocean. The process we have includes the use of a pump of our design but does not limit our process from the use of other pump designs. The temperature difference between the surface temperature and the temperature of the water we pump to the surface prevents the two from mixing. The temperature difference between the two masses of water creates a thermocline. The cold water spreads out to create a cold water sheet over the warmer surface water.

The thermocline stimulates the growth of phytoplankton. An increased level of phytoplankton increases the sequestration of carbon dioxide. The increased sequestration of carbon dioxide decreases the amount of carbonic acid dissolved in ocean waters which, in turn, lowers the alkalinity of the oceans, further increasing the growth of plankton. The reduction in carbonic acid is directly correlated to an increase of calcium carbonate.

Our process causes an increase in the growth of phytoplankton, increasing available oxygen. An increase in dissolved oxygen increases zooplankton growth. Zooplankton sequesters calcium carbonate to the deep ocean. Calcium carbonate, by nature, sinks. Calcium carbonate sequestration eliminates carbon from the atmosphere, potentially for millennia, if it reaches the sea floor.

The cold water of the thermocline we produce will create a bather to tropical storms. Hurricanes need a surface temperature of 80 degrees to sustain their strength. A strategically placed thermocline of sufficient depth would keep Atlantic storms out of the Caribbean and the Gulf of Mexico. A decrease in storm activity would decrease turbidity, increasing the amount of light reaching the euphotic region of the ocean. The decrease in turbidity would increase the amount of light able to penetrate to a greater depth, further increasing phytoplankton growth. The accelerated growth would increase sequestration of carbon dioxide.

DETAILED DESCRIPTION OF THE INVENTION

Figure 1:
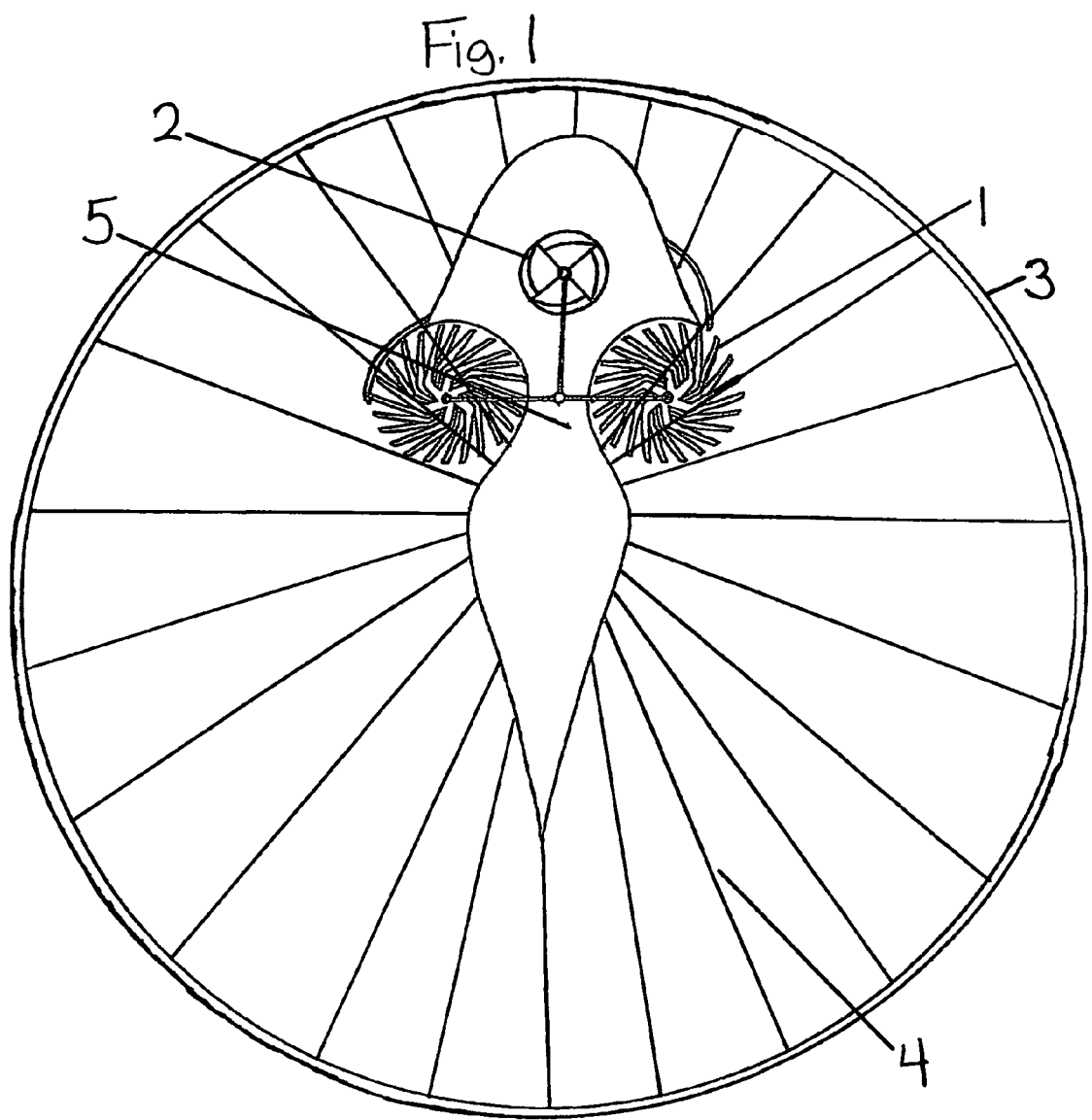
FIG. 1 is a top view of a Mechanically Produced Thermocline Based Ocean Temperature Regulatory System.

The Mechanically Produced Thermocline Based Ocean Temperature Regulatory System is a system and a process to pump cold water from a depth sufficient enough to produce a thermocline on the surface of the ocean.

The difference in temperature and salinity between the surface water and the water pumped up from the deep keeps the two from mixing. The temperature and salinity differences between the water from a depth of 2000 to 3000 ft and the water on the surface in most tropical and subtropical seas is sufficient to create a thermocline.

The system to create the thermocline consists of a floating pump surrounded by a separation bather, with a feed tube attached to the bottom of the pump. The pump in the system that we have designed is powered by ocean currents, but the concept is not limited to the use of our pump. The pump we have designed is a floating vessel with turbines set into each of its two sides. The turbines are directly geared to an impeller. The impeller pumps water from the top of the column of water in the feed tube. The feed tube is open at the bottom. The water that is replacing the water that is being pumped is coming up from depths up to 2000-3000 ft. The water that is pumped off of the top of the column of water overflows the pump and is caught by the separation barrier.

The feed tube is a flexible membrane that is seamed into the shape of a tube which is open on each end. The feed tube is suspended from the bottom of the pump and hangs down into the deep water. The feed tube is kept open with rings which are attached to the inside of the tube at regular intervals. The tube is kept in a vertical position by lines which are attached to the bottom of the pump, hang down the length of the tube, inside the tube, and are attached to a weighted ring, which is attached to the bottom of the feed tube.

The separation barrier is a flexible membrane attached to the perimeter of the pump, above the level of the turbines. The separation barrier extends out to an inflated ring, to which it is attached. The separation barrier catches the water that is pumped up. The separation barrier prevents mixing of the pumped up water and the water below it. The barrier allows the water to flow out smoothly over the surface of the water as the pumped up water overflows the inflated ring.

The thermocline is beneficial in many ways. The mass of cold water promotes phytoplankton growth, increasing food available for fish. The increased growth of phytoplankton sequesters CO2 which can then be consumed by zooplankton in the form of carbohydrates. The zooplankton sequesters the carbohydrates into calcium carbonates and calcium bicarbonates. The calcium carbonates and bicarbonates sink and are sequestered into the depths of the ocean, potentially for thousands of years.

A larger scale thermocline can be created by the use of multiple
pumps in strategic groupings. These large-scale created thermoclines can be positioned to work as a cold water barrier to hurricanes and tropical storms.

Figure 2:
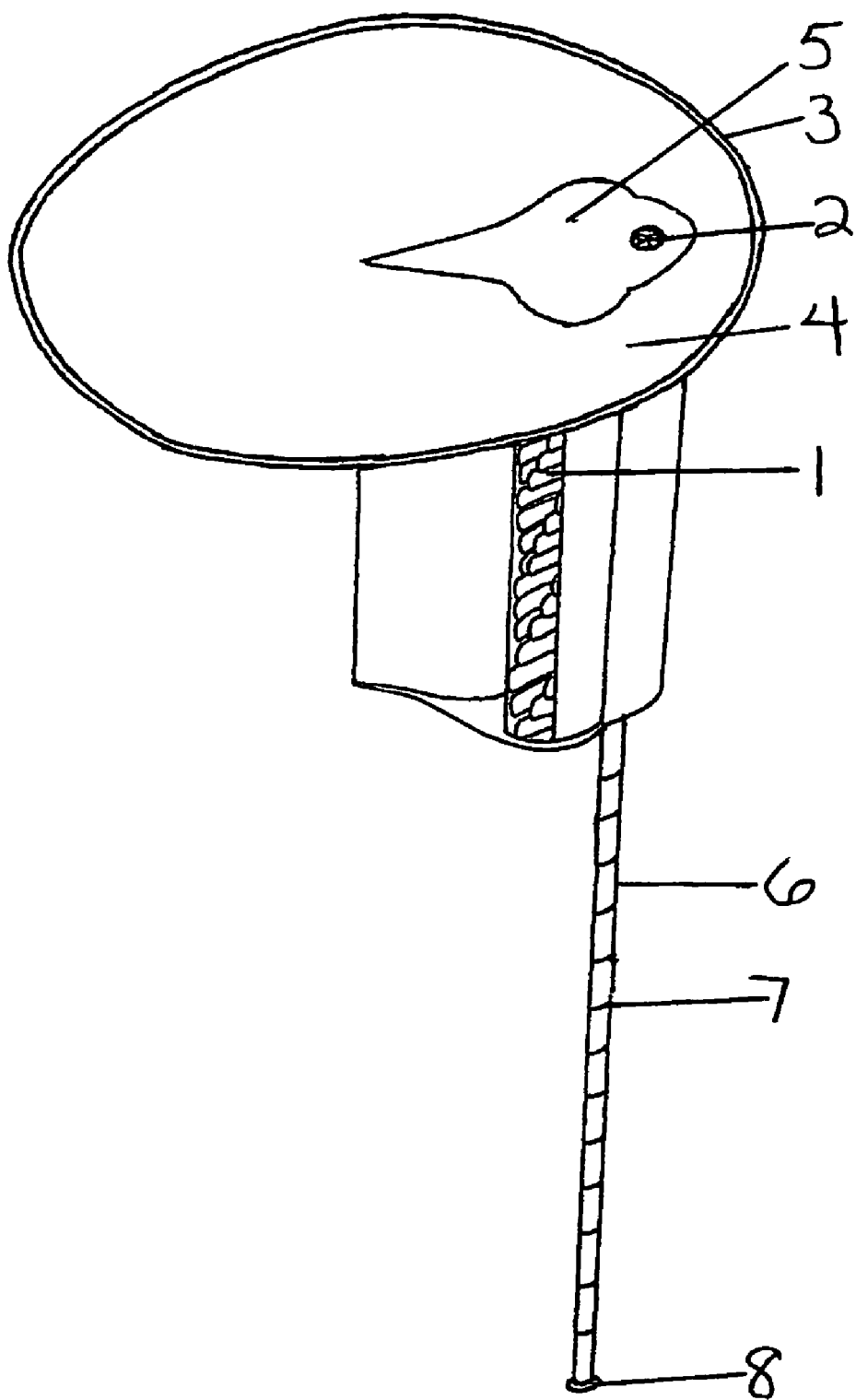
FIG. 2 is a side view of a Mechanically Produced Thermocline Based Ocean Temperature Regulatory System.
Figure 3:
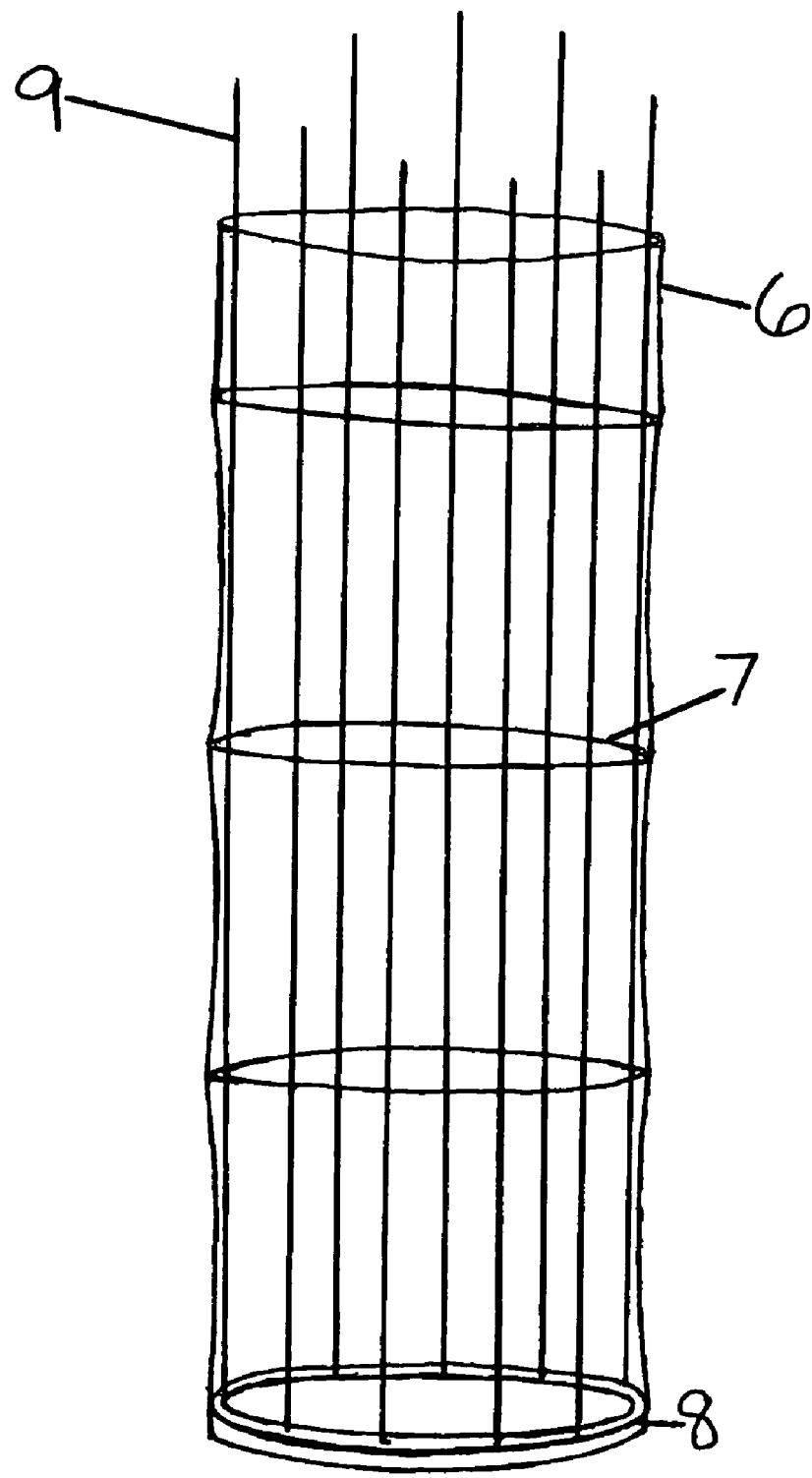
FIG. 3 is a side view of the Feed Tube.
Figure 4:
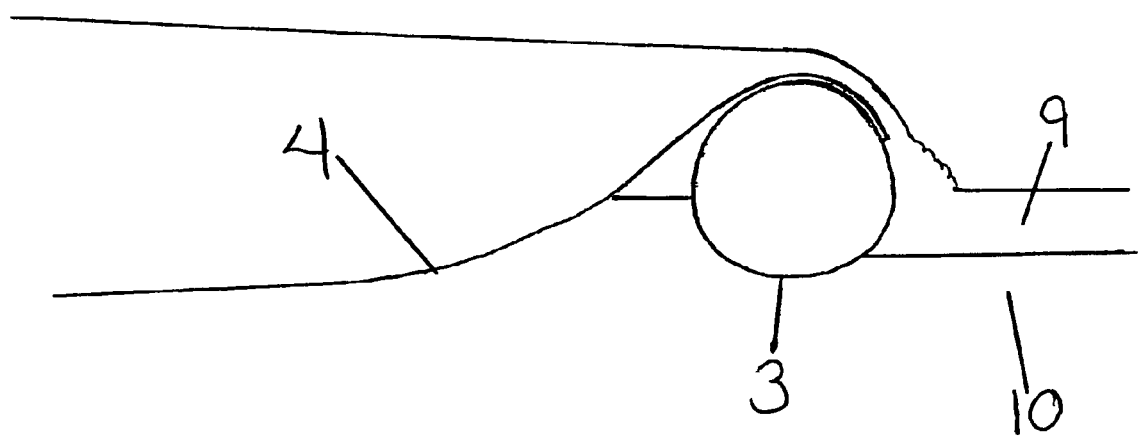
FIG. 4 is a cross section view of the Separation Bather and Inflated Ring

FIG. 1 top view of a Mechanically Produced Thermocline Based Ocean Temperature Regulatory System
1 Turbine
2 Impeller
3 Inflated Ring
4 Separation Barrier
5 Mechanical Pump FIG. 2 side view of a Mechanically Produced Thermocline Based Ocean Temperature Regulatory System
1 Turbine
2 Impeller
3 Inflated Ring
4 Separation Barrier
5 Mechanical Pump
6 Feed Tube
7 Rings
8 Weighted Ring FIG. 3 side view of the Feed Tube
6 Feed Tube
7 Rings
8 Weighted Ring
9 Lines FIG. 4 cross-section view of the Separation Barrier and the Inflated Ring
3 Inflated Ring
4 Separation Barrier
9 Thermocline
10 Ocean

We claim:

1. A Mechanically Produced Thermocline Based Ocean Temperature Regulatory System comprised of:
   (1) an ocean current powered mechanical pump to pump water from the mesopelagic or epipelagic zone to the surface,
   (2) a feed tube that attaches to and runs from the bottom of the mechanical pump down to a depth where the salinity and temperature difference is sufficient to sustain a cold water thermocline on the surface,
   (3) a floating separation barrier to eliminate the mixing of surface water and the water pumped from the mesopelagic or epipelagic zone.

2. A Mechanically Produced Thermocline Based Ocean Temperature Regulatory System as described in claim 1 where the mechanical pump is powered by turbines which are powered by ocean currents.

3. A Mechanically Produced Thermocline Based Ocean Temperature Regulatory System as described in claim 1 where the mechanical pump uses centrifugal force to spin the water which is at the top of the column of water in the feed tube so the water flows up and over the mechanical pump.

4. A Mechanically Produced Thermocline Based Ocean Temperature Regulatory System as described in claim 1 where the feed tube is of one piece continuous construction from top to bottom made of a flexible membrane seamed into a tube.

5. A Mechanically Produced Thermocline Based Ocean Temperature Regulatory System as described in claim 1 where the feed tube is kept open with rigid rings placed at regular intervals attached to the inside of the tube.

6. A Mechanically Produced Thermocline Based Ocean Temperature Regulatory System as described in claim 1 where the feed tube is kept in line from top to bottom, against the current, with lines inside of the tube attached to the bottom of the pump and down to a weighted ring.

7. A Mechanically Produced Thermocline Based Ocean Temperature Regulatory System as described in claim 1 where the separation barrier is attached to and sealed to the circumference of the mechanical pump, and radiates out to and is attached to and is supported by an inflated ring.

8. A Mechanically Produced Thermocline Based Ocean Temperature Regulatory System as described in claim 1 where the separation barrier catches all of the water that overflows the mechanical pump and allows the water to flow out at its perimeter.

9. A Mechanically Produced Thermocline Based Ocean Temperature Regulatory System as described in claim 1 where the cold water thermocline promotes the growth of phytoplankton, increasing sequestration of CO2 in solution.

10. A Mechanically Produced Thermocline Based Ocean Temperature Regulatory System as described in claim 1 where the cold water thermocline directly controls the solubility of carbonic acid into solution, reducing acidity.

11. A Mechanically Produced Thermocline Based Ocean Temperature Regulatory System as described in claim 1 to inhibit the dissolution of coral by reducing the level of carbonic acid in solution.

12. A Mechanically Produced Thermocline Based Ocean Temperature Regulatory System as described in claim 1 where multiple systems, placed in strategic groupings, will create a cold water thermocline which will act as a barrier to hurricanes and tropical storms eliminating hurricanes and tropical storms in the area above the thermocline.

13. A Mechanically Produced Thermocline Based Ocean Temperature Regulatory System as described in claim 1 where the cold water thermocline will increase the growth of algae.

14. A Mechanically Produced Thermocline Based Ocean Temperature Regulatory System as described in claim 1 which, when placed in the Arctic, would create high saline sea ice used to ensure the function of the thermohaline circulation, as the cold water's higher salinity will insure the sink in the northern point of the Atlantic conveyor.

15. A Mechanically Produced Thermocline Based Ocean Temperature Regulatory System as described in claim 1 where increased growth of phytoplankton increases available oxygen and food for increased zooplankton growth.

16. A Mechanically Produced Thermocline Based Ocean Temperature Regulatory System as described in claim 1 where an increase in the growth of phytoplankton for zooplankton to consume allows for greater conversion of carbohydrates into calcium carbonates and calcium bicarbonates which are then sequestered into the depths of the ocean for, potentially, thousands of years.

17. A Mechanically Produced Thermocline Based Ocean Temperature Regulatory System as described in claim 14, which during the Arctic summer would increase the amount of high saline cold water flowing off of the cold water thermocline which is in the form of ice; the increase in flow of high salinity cold water would ensure the function of the thermohaline by ensuring the sink in the northern point of the Atlantic Conveyor.

* * * * *